(12) United States Patent
Stewart

(10) Patent No.: US 7,336,220 B2
(45) Date of Patent: Feb. 26, 2008

(54) METHOD AND APPARATUS FOR EQUALIZING BROADBAND CHIRPED SIGNAL

(75) Inventor: Todd Alan Stewart, N. Andover, MA (US)

(73) Assignee: M/A-Com, Inc., Lowell, MA (US)

( * ) Notice: Subject to any disclaimer, the term of this patent is extended or adjusted under 35 U.S.C. 154(b) by 63 days.

(21) Appl. No.: 11/444,684

(22) Filed: Jun. 1, 2006

(65) Prior Publication Data

US 2007/0279278 A1  Dec. 6, 2007

(51) Int. Cl.
*G01S 7/35* (2006.01)
*G01S 13/00* (2006.01)
*G01S 7/36* (2006.01)

(52) U.S. Cl. .................... 342/159; 342/89; 342/91; 342/92; 342/175; 342/195; 342/378; 375/229; 375/230; 375/231; 375/316; 375/346

(58) Field of Classification Search ............ 342/13–21, 342/118, 128–133, 159–164, 175, 195, 89, 342/91–93, 145, 378–384; 380/252–254, 380/33, 34, 270; 375/229–236, 316, 346–351, 375/340, 343; 455/39, 500, 501–506, 63.1–65, 455/67.11, 67.13, 130, 230, 232.1–253.2, 455/272, 278.1, 296; 704/201, 205
See application file for complete search history.

(56) References Cited

U.S. PATENT DOCUMENTS

| | | | | |
|---|---|---|---|---|
| 2,423,546 | A | * | 7/1947 | Bedford .................. 380/252 |
| 4,037,159 | A | * | 7/1977 | Martin .................... 375/343 |
| 4,244,053 | A | * | 1/1981 | Clinch et al. ............. 380/34 |
| 4,255,791 | A | * | 3/1981 | Martin .................... 375/232 |
| 4,359,736 | A | * | 11/1982 | Lewis ...................... 342/16 |
| 4,361,729 | A | * | 11/1982 | Barnes et al. ............ 380/254 |

(Continued)

OTHER PUBLICATIONS

A. Batra et al., "Mitigation of Narrowband Interference Using Adaptive Equalizers"; Proceedings of the European Signal Processing Conference (EUSIPCO); Florence, Italy; Sep. 2006.*

*Primary Examiner*—Bernarr E. Gregory

(57) ABSTRACT

In order to generate a signal for canceling a chirped signal, a transmitter generates a cancellation signal along with the transmitted signal, using a single term variable complex gain multiplier adapted to cancel the chirped signal only at its instantaneous frequency, rather than attempting to cancel it with a complex FIR filter that works over the entire bandwidth of the chirped signal. The cancellation signal is varied in amplitude and phase as a function of the frequency of the chirped transmit signal for which it is intended to compensate. Since the signal that is to be cancelled is essentially sinusoidal but swept through a frequency range, the cancellation signal for the instantaneous transmit signal needs to be swept in both amplitude and phase in unison with the change in frequency of the transmit signal in order to accommodate gain and phase changes in the transmitted signal as a function of frequency. Particularly, the gain as well as the phase of the transmit signal generally will vary as a function of frequency due to limitations of the signal generation circuitry. Therefore, the cancellation signal must be varied in both amplitude and phase as a function of frequency. The necessary algorithm for changing the amplitude and/or phase of the cancellation signal as a function of frequency of the transmit signal can be readily determined by conventional techniques during a training session.

25 Claims, 2 Drawing Sheets

U.S. PATENT DOCUMENTS

| | | | |
|---|---|---|---|
| 4,733,237 A * | 3/1988 | Apostolos et al. | 342/13 |
| 4,965,581 A * | 10/1990 | Skudera et al. | 342/19 |
| 5,067,137 A * | 11/1991 | Kaneko | 375/232 |
| 5,181,243 A * | 1/1993 | Saltwick et al. | 380/253 |
| 5,349,609 A * | 9/1994 | Tsujimoto | 375/347 |
| 5,355,091 A * | 10/1994 | Albert et al. | 342/19 |
| 5,424,674 A * | 6/1995 | Skudera et al. | 342/159 |
| 5,526,162 A | 6/1996 | Bergano | |
| 5,644,596 A * | 7/1997 | Sih | 375/232 |
| 5,880,645 A * | 3/1999 | Everitt et al. | 375/232 |
| 5,912,755 A | 6/1999 | Bergano | |
| 5,946,119 A | 8/1999 | Bergano et al. | |
| 6,057,950 A | 5/2000 | Bergano | |
| 6,389,069 B1 * | 5/2002 | Mathe | 375/232 |
| 6,405,163 B1 * | 6/2002 | Laroche | 704/205 |
| 6,556,326 B2 | 4/2003 | Bergano | |
| 6,744,992 B2 | 6/2004 | Bergano | |
| 2001/0002207 A1 * | 5/2001 | Miyamoto et al. | 375/346 |
| 2004/0088281 A1 | 5/2004 | Matsuishi | |
| 2004/0161245 A1 | 8/2004 | Bergano | |

* cited by examiner

METHOD AND APPARATUS FOR EQUALIZING BROADBAND CHIRPED SIGNAL

FIELD OF THE INVENTION

The present invention relates to equalization of chirped signals and the like.

BACKGROUND OF THE INVENTION

A chirped signal generally refers to a sinusoidal signal that varies in frequency over time, typically sweeping back and forth over a predetermined frequency range at a predetermined periodicity. Chirped signals are used, for instance, in radar applications. For instance, in radar, it is often desirable to generate a chirped transmit signal so that the delay between transmission of a wave and the return of the reflection of the wave off of a tracked object can be determined by measuring the frequency of a received reflected signal relative to the frequency of the contemporaneous transmitted signal.

In at least one common form of radar, the same antenna is used to transmit an outgoing signal (waves) and to receive the resultant return signals reflected from objects in the path of the transmitted waves. Particularly, the transmitter is turned on for a specified period to feed a transmit signal to the antenna, then it is turned off and the receiver is turned on to receive any reflected signals and then the receiver is turned off. The process is repeated continuously.

In other forms of radar, separate antennas are used for transmit and receive functions so that each transmitter circuit, receiver circuit, and associated antenna continuously transmits or receives. The separate transmit and receive antennas may be physically close to each other or physically remote from each other. However, if they are close to each other, the signal transmitted from the transmit antenna will likely couple onto the receive antenna. This is generally undesirable and requires equalization of the receive signal in order to compensate for such interference.

With respect to radar applications in which high accuracy is required and/or a large geographic area is to be observed, such as military and avionic applications, it is common to use antenna arrays comprising a plurality of antennas physically spaced from each other over a designated geographic area. In such antenna arrays, each transmit antenna transmits a signal. All transmit antennas transmit the same signal, except that the phases may be made different for purposes of beam forming, as is known in the art. Particularly, it is known in the art to send out a highly directional transmit signal by adjusting the phases of the transmit signals provided to each transmit antenna relative to each other to beam form the collective transmit signal to create a highly directional beam. It is common to sweep that signal over an angular range (e.g., to 60° on either side of a forward-looking direction) using this type of beam forming. The various antenna elements in the antenna array send out a collective wave front that reflects off of objects in its path and returns to the receive antennas.

Each receive antenna, of course, receives whatever waves pass by that antenna, which is likely to include (1) waves that are reflections of waves generated by the transmit antennas (which, as noted above, may be the same antennas as the receiving antennas), (2) waves received directly from other transmit antennas in the antenna array, and (3) waves from other sources of interference, such as other electronic equipment in the area. Only the first signal is desired. The rest essentially are interference.

In virtually any type of communication or telemetry system (such as radar), a received signal may need to be equalized in order to compensate for various forms of interference, echo, channel impulse response, and other unwanted signal components. It therefore may be necessary to equalize the signal received at a receive antenna in an antenna array of a radar system to compensate for (e.g., cancel) the signals that are the transmit signals from all of the transmit antennas in the array.

Equalization in digital communication or telemetry systems often is performed in the digital domain, for instance, by finite impulse response (FIR) filters. If the unwanted signal component has a wide bandwidth, such as would be the case for a chirped radar transmit signal, which might be swept over a very broad bandwidth, the necessary FIR filter to cancel such a signal component will need to have many taps and be extremely long and complex.

Another form of unwanted signal component is echo within a channel. Generally, any impedance mismatch in a signal path will cause a part of the signal to reflect back toward the transmitter. Impedance mismatches typically exist at the interface between two separate physical components in a signal path. Thus, for instance, in a radar system, there may be an impedance mismatch at the interface between a connector and a wire, between any two pieces of equipment, and even at the interface between the metal surface of the antenna and the air. The reflected signal returns to the transmitter after the propagation delay of the path from the transmitter to the reflecting interface and back and gets mixed in with the transmitted signal. A received signal also may require equalization in order to cancel this type of echo interference.

For purposes of clarity, this latter type of return signal shall be referred to as an "echo", while the signals that are reflected off of objects within the range of the radar in a radar system are called "reflected" signals in order to clearly differentiate between the two different types of reflected signals.

Accordingly, it is an object of the present invention to provide an improved method and apparatus for equalizing a chirped signal.

SUMMARY OF THE INVENTION

The invention is a method and apparatus for canceling an interference signal from a receive signal in cases where the interference signal has an narrow instantaneous bandwidth but a broad bandwidth over time (e.g., a chirped signal), in which: a frequency-dependent gain factor is determined, the gain factor comprising an amplitude and phase frequency response adapted to compensate for the interference signal in its narrow instantaneous bandwidth and being varied as a function of the frequency of the interference signal over the broad bandwidth; a first signal that is equivalent to a source signal of the interference signal is generated and then multiplied by the gain factor to generate a cancellation signal which is then added to the receive signal.

DETAILED DESCRIPTION OF THE INVENTION

In accordance with the present invention, in order to generate a signal for canceling a known, unwanted chirped signal, a cancellation signal is generated using a single-term, variable, complex gain multiplier adapted to cancel the chirped signal only in its narrow instantaneous frequency range, rather than attempting to cancel it with a complex FIR or other filter that continuously compensates over the entire bandwidth of the chirped signal. The simple, narrowband cancellation signal is varied in amplitude and phase as a function of the frequency of the chirped transmit signal which it is intended to compensate. Since the signal that is to be cancelled is essentially a narrowband sinusoidal signal, but swept through a broad frequency range, the cancellation signal for the instantaneous transmit signal needs to be varied in both amplitude and phase in unison with the change in frequency of the transmit signal in order to accommodate gain and phase changes in the transmitted signal as a function of frequency. Particularly, the phase of the transmit signal (and thus the interference signal) generally will vary as a function of frequency. Also, while the amplitude of the original source of the interference signal typically is not varied, the amplitude of the interference signal itself does vary as a function of the frequency primarily due to limitations of the isolation circuitry used to isolate the antennas from each other. Such circuitry typically performs better at certain frequencies than at other frequencies. Therefore, the cancellation signal must be varied in both amplitude and phase as a function of frequency. The necessary algorithm to vary the amplitude and/or phase of the cancellation signal as a function of frequency of the transmit signal can be readily determined during a training session using conventional noise training techniques.

In a radar system using an antenna array, the cancellation signal corresponding to any given transmit antenna can be subtracted from the receive path of the receivers of the other antennas. The time delay, amplitude, and phase of the cancellation signal needed will differ for each of the antennas, such that it may be necessary to generate a different cancellation signal for each such transmit antenna. On the other hand, in an array in which all of the antennas transmit identical signals, a plurality of antennas having essentially equal distances from the particular receive antenna for which equalization is being performed may have sufficiently similar parameters that it may be practical to use a single cancellation signal for that plurality of antennas.

Figure 1:
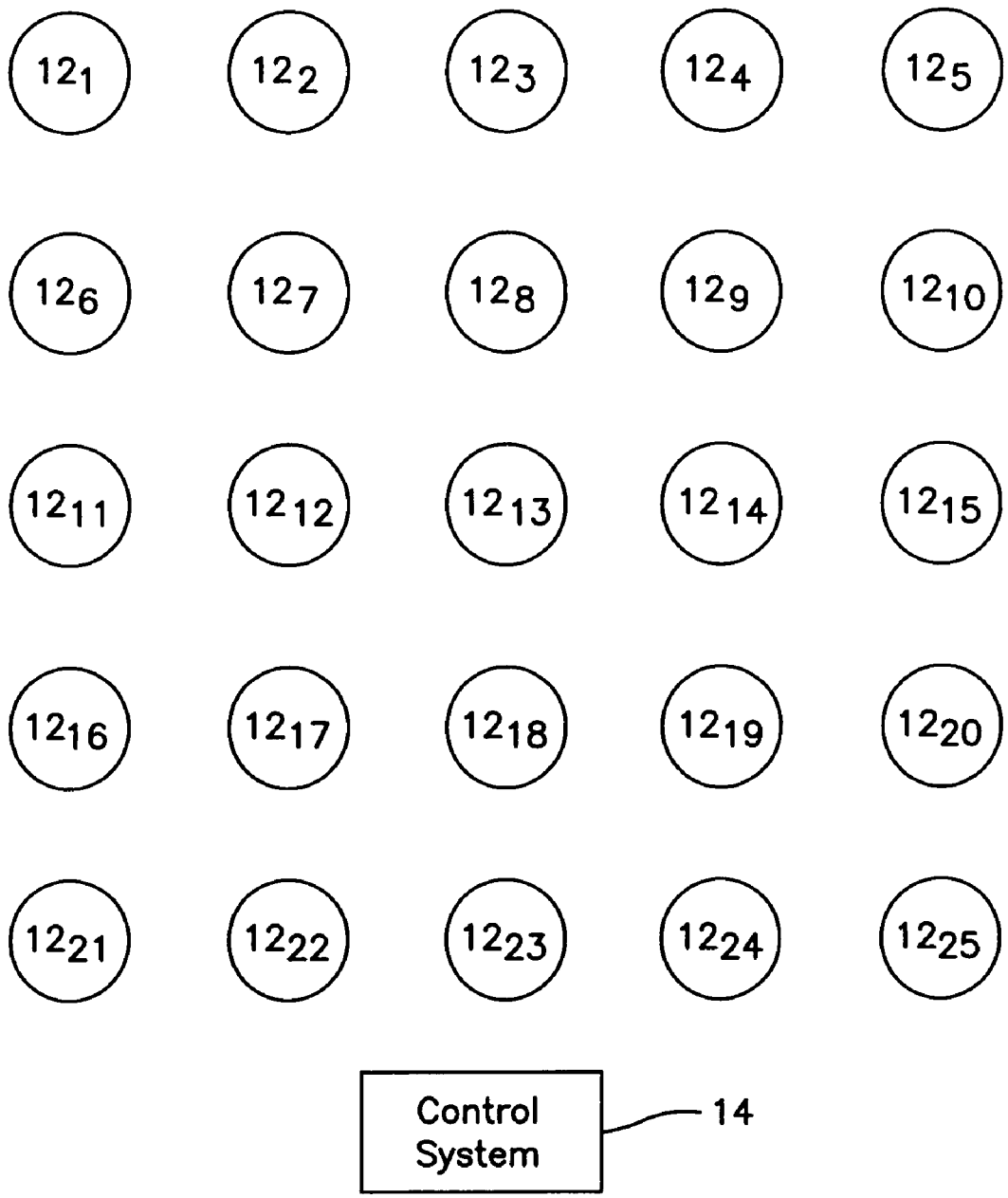
FIG. 1 is a diagram of one exemplary radar system employing an array of antennas in which each antenna is used both as a transmit antenna and a receive antenna.

FIG. 1 is a diagram illustrating a 5×5 antenna array and radar system 10 in which the present invention can be employed. The antennas $12_1$, $12_2$, $12_3$, ... $12_{25}$ are arranged in a regular square grid. However, this is merely exemplary. Furthermore, in the illustrated embodiment, each antenna 12 in the array serves double duty as a receive antenna and a transmit antenna. Again, this is merely exemplary, as the invention can readily be applied to systems using separate receive and transmit antennas. Furthermore, while the embodiment of the invention discussed hereinbelow is an antenna array type application, the present invention is not so limited and can be used for equalization in other types of applications.

The antennas 12 are coupled to a central control system 14 that controls the antennas to transmit chirped signals. The central control system also receives the receive signals from the antennas for processing. Such processing includes, of course, analyzing the receive data to detect objects in the designated geographic zone. Such processing also includes equalization of the receive signals to compensate for unwanted signal components, i.e., interference. On the other hand, the equalization (as well as other signal processing) could be performed locally at each antenna.

As previously noted, there can be several forms of unwanted signal received by the receive antennas that could interfere with the true signal that the receiver wants to observe, namely signals that are reflections of the signals transmitted from the transmit antenna array. These include local echo (i.e., echo from low isolation, leakage, or impedance mismatches in the transmit channel of the antenna itself) as well as the signals received over the air that are the transmit signals of the other transmit antennas in the array.

The present invention pertains to a technique for equalization of a chirped or similar signal, in which the signal is relatively broad in bandwidth over time, but relatively narrow in bandwidth at any given instant. In accordance with the concepts of the invention, correction is not performed by trying to compensate over the entire range of the chirped interference signal, which would require very complex and long broadband FIR filters with many taps. Rather, correction is performed for each antenna by generating a correction signal that only corrects over the relatively narrow, instantaneous bandwidth of the chirped interference signal using a much simpler single term complex multiplier, but varying the phase and amplitude of the correction signal as a function of the known instantaneous frequency of the chirped transmit signal.

Particularly, the phase and amplitude of the interference signal received from each other antenna generally will vary in gain and phase as a function of frequency. The phase of the interference signals varies with frequency because the phase of the source is varied over time for purposes of beam steering. The amplitude of the interference signals varies with frequency because the local isolation circuitry typically offers better performance at certain frequencies than at other frequencies.

In addition, the distance between the local antenna at which interference cancellation is being performed and the source antenna of the interference signal affects the phase of the interference signal. The frequency dependent characteristics of the phase and amplitude of the transmit signal as well as the necessary delay can be readily determined using conventional noise training techniques. One or more complex digital multipliers can be used to multiply the local chirped signal by a time-varying phase and amplitude value (determined through the aforementioned training) that cancels the interference signal from another antenna in the array. That cancellation signal can be converted into an analog signal and subtracted from the received signal.

Figure 2:
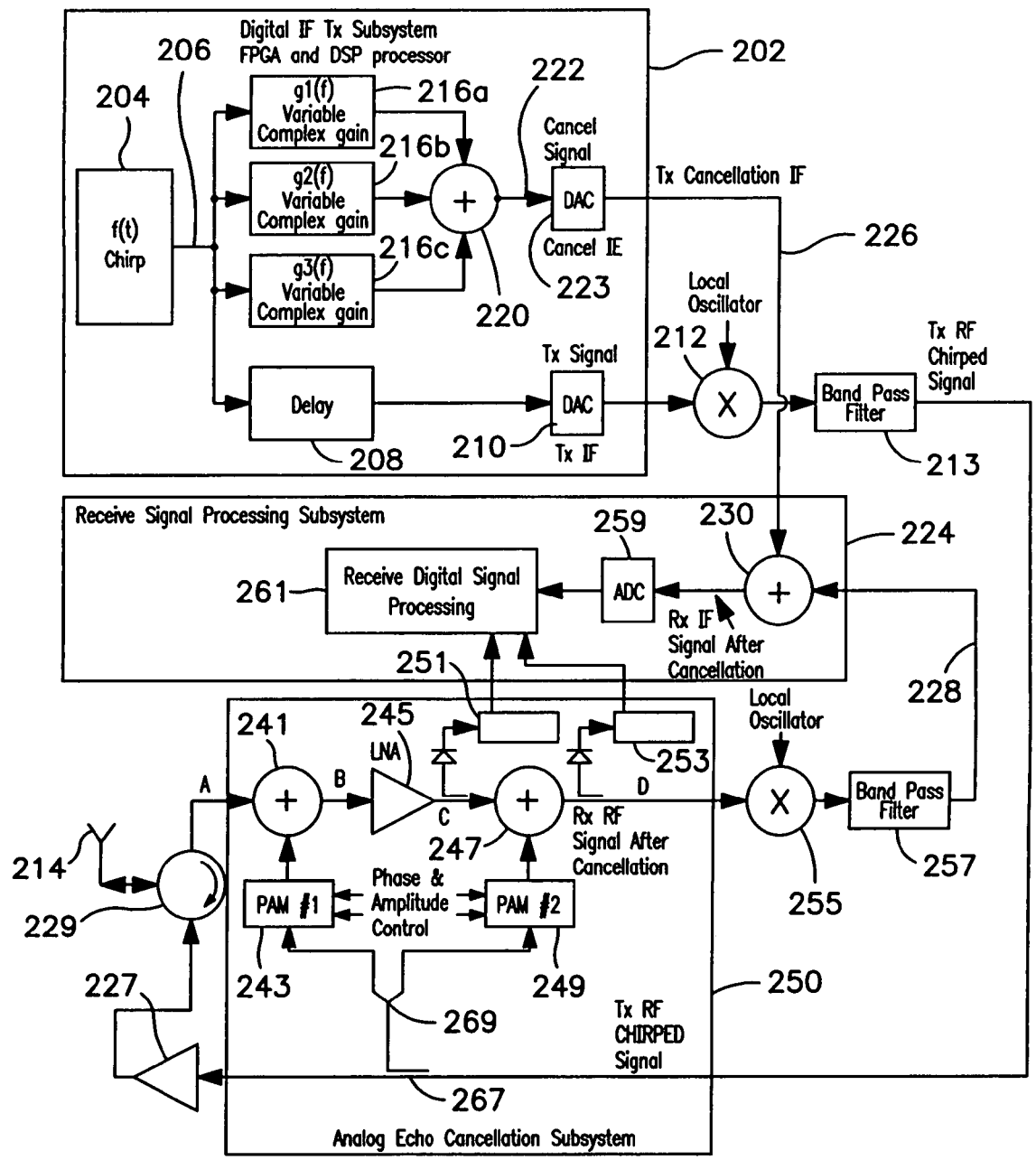
FIG. 2 is a block diagram of the transmitter, receiver and related circuitry of a radar system employing an array of antennas in accordance with the present invention.

FIG. 2 is a block diagram of the transceiver circuitry corresponding to one of the antennas of the chirped radar system illustrated in FIG. 1 employing the concepts of the present invention. Each antenna 12 in the antenna array illustrated in FIG. 1 transmits a chirped signal. As an example, the chirped signal may be varied in frequency from 5.00 GHz to 5.10 GHz at a periodicity of 10 milliseconds.

The transmit portion 202 of each antenna includes a chirped signal generator 204 that generates a complex digital base band chirped signal that sweeps from −50 MHz to +50 MHz. That signal is output on line 206 to a delay circuit 208 having a delay selected so as to align the transmit signal with the cancellation signal on line 226, as will be discussed further below. The delayed base band signal is shifted from base band to IF (intermediate frequency) and converted to analog by a digital to analog converter (DAC) 210 including a quadrature modulator to generate an analog IF signal. The analog IF signal is mixed with a local oscillator signal by a mixer 212 to further frequency up convert it to the RF transmission frequency (e.g., 5.00 GHz to 5.10 GHz). The RF transmission signal is filtered by a band pass filter 213 and forwarded to an amplifier 227. The output of the amplifier is fed to the Tx/Rx antenna 214 through a circulator 229. Alternately, different transmit and receive antennas could be employed.

In addition, the base band chirped signal on line 206 is forwarded to one or more single-term, variable, complex gain multipliers 216a, 216b, 216c. As will be explained below, each multiplier 216 is designed to generate a compensation signal for one (or more) of the transmit signals of the other transmit antennas in the array. Since the interference signal that is to be cancelled by these circuits 216 is a chirped signal, it has a narrow bandwidth at any given instant (typically less than 50 KHz wide) even though the overall bandwidth of the signal is broadband (e.g., 100 MHz). Thus, if the cancellation signal is designed so as only to correct over an narrow instantaneous bandwidth, it can be implemented by a very simple single-term multiplier. Since all of the antennas in the array are synchronized and, therefore, all have the same instantaneous frequency, the complex gain factor can actually be multiplied with the output signal of the local antenna and without the need to go out and get the signal information from the other antennas whose signals are actually being cancelled. In order to cover the entire broad sweep range of the chirped signal, the amplitude and phase of the multiplier should be time-varying wherein the amplitude, A, and phase, $\Phi_1$, are varied as a function of the instantaneous frequency of the local antenna, which, as mentioned above, also is the instantaneous frequency of the other antenna(s) that is the source of the interference signal.

More specifically, the amplitude of the interference signal varies as a function of the frequency of the source chirped signal because the isolation circuitry used to isolate the various antennas of the array from each other is frequency dependent, i.e., operating more effectively at certain frequencies than at others. This frequency dependent behavior can be determined using well-known training techniques.

The frequency-dependent phase of the interference signal (s) also can be determined readily. The frequency-dependent phase of the interference signal is the result of the intentional (and known) time-dependent phase variations in the chirped output signal of each antenna for purposes of beam steering. Nevertheless, phase training is also necessary because of the phase of the interference signal from any given antenna will depend partially on the distance to that antenna. That portion of the phase difference between the local chirped signal and the interference signal is not time-dependent, but does need to be determined by training.

Each multiplier 216 generates a cancellation (or correction) signal designed to cancel the interference signal from at least one of the other transmit antennas in the antenna array. It is possible that a single multiplier 216 can be used to cancel the interference signal from multiple other antennas. Particularly, since the chirped transmit signals of each antenna have the same narrow band instantaneous frequency and amplitude, the only differences between those transmit signals that have the same amplitude and narrow band instantaneous frequency are (1) the propagation delays between the transmitting antennas whose signals are being cancelled and the local antenna and (2) the phase differences between the signals being fed into the antennas. However, even further, if the antennas are arranged at reasonably regular spacing, such as illustrated in FIG. 1, for any given antenna in the array, there may be a plurality of other antennas that are essentially equidistant from that antenna and are outputting signals with the same amplitude and narrow band instantaneous frequency.

There is no requirement that each interfering antenna being cancelled by a single multiplier have equal phase. The vector sum of the interference signals from multiple equidistant antennas is all that is required. In fact, all four interference sources could have different interference magnitudes as well as different phase offsets and still be cancelled using a single multiplier.

For instance, using antenna $12_{13}$ as an example, note that antennas $12_{12}$, $12_{14}$, $12_8$ and $12_{18}$ are the same distance from antenna $12_{13}$. Therefore, a single multiplier 216 theoretically can be used to generate a correction signal that collectively corrects for all four of these equidistant antennas ($12_{12}$, $12_{14}$, $12_8$, and $12_{18}$) in the receiver of antenna $12_{13}$ as the chirp sweeps across the band. The equidistant requirement is imposed due to the fact that, as the signal sweeps across the band, the wavelength changes, but because this group of four antennas is equidistant, the phase of all four antennas as received at antenna $12_{13}$ will change in unison. Hence, the single multiplier 216 can compensate for the group collectively. In fact, perhaps even antennas $12_7$, $12_9$, $12_{17}$ and $12_{19}$ have a similar enough distance to antenna $12_{13}$ as aforementioned antennas $12_{12}$, $12_{14}$, $12_8$, and $12_{18}$ that they can also be grouped with this group. If not, then another multiplier can be used to compensate for this group of four antennas ($12_7$, $12_9$, $12_{17}$ and $12_{19}$). Likewise, antennas $12_3$, $12_{11}$, $12_{15}$, and $12_{23}$ are essentially equidistant from antenna $12_{13}$ and, therefore, the interference signals from any of those antennas can be collectively cancelled using another multiplier. As a final example, antennas $12_1$, $12_5$, $12_{21}$, and $12_{25}$ are essentially equidistant from antenna $12_{13}$ and, therefore, can be cancelled for using one other multiplier. The exemplary system illustrated in FIG. 2 shows three multipliers 216a, 216b, 216c, each correcting for a plurality of antennas in a respective antenna group. The number of separate multipliers employed will depend on the particular application.

In fact, theoretically, if the system utilized only a single fixed frequency, a single multiplier could suffice to cancel the signals from all of the interfering sources regardless of differences in distance from the local antenna. However, as the interference signals sweep across the broad band, the magnitude and phase relationship of all the non-equidistant antenna interference signals may be too complicated to determine in a single multiplier or may even be unsolvable in any practical sense. The equidistant antenna grouping for each multiplier makes the problem practical to solve.

It may not be necessary to provide cancellation for the more distant antennas because those other antennas may be sufficiently distant from antenna $12_{13}$ that their signals do not affect antenna $12_{13}$ or, at least, are too small by the time they reach antenna $12_{13}$ to merit correction.

The function of each multiplier 216 can be represented as $$g_n(f) = A_n(f) * e^{j\phi n(f)}$$

where f=instantaneous frequency of the local chirped signal;

$A_n(f)$=amplitude of the interference signal as a function of the chirp signal frequency;

$e^{j\phi n(f)}$=the phase of the interference signal as a function of the chirp signal frequency; and n=an index identifying the particular multiplier.

Note, in FIG. 2, that the complex terms $g_1$, $g_2$, etc. are multiplied with the local chirped signal rather than the chirp signal from the antenna(s) for which cancellation is being performed in the multipliers 216. This can be done because, every transmit antenna in theory is fed the same basic chirped signal, except, as noted above, that the phase may be different. Therefore, the frequency-dependent amplitude A and phase φ can be adjusted as a function of the local antenna frequency since it has the same instantaneous frequency as the antenna whose signal is being canceled. In other applications in which this is not the case, it would be necessary to multiply the true signal source of the interference signal by g.

Note that, a given multiplier 216 may be used to compensate for the interference signals from more than one of the transmit antennas, The terms A and φ must be set as a function of the collective frequency dependent amplitude and phase characteristics of those antennas. In theory, a single multiplier can be used to cancel interference signals from all other antennas. However, as a practical matter, the training and programming of A and φ can become rather complex as the number of antennas increases. It is believed preferable in many cases to limit each multiplier to compensating for one or a few antennas.

The outputs of the multipliers 216a, 216b, 216c are summed in summing circuit 220 to generate a combined cancellation signal on line 222. That combined cancellation signal is converted to analog by a digital to analog converter 223 and forwarded to the receiver portion 224 for that antenna. The analog cancellation signal on line 226 is subtracted by an adder 230 from the incoming signal on line 228 received by the antenna 214.

With this method, any narrow band instantaneous, highly undulating frequency response, $A_n(f)$, can be realized over a broad frequency spectrum. Also, by varying the phase $\phi_n(f)$, any varying delay required across the full spectrum of the chirped signal can be realized.

It should be understood that each transmit/receive antenna (or transmit/receive antenna pair in systems using separate transmit and receive antennas) in the array will have a similar configuration to that shown in FIG. 2.

The particular functions $A_n(f)$ and $\phi_n(f)$ can easily be determined using conventional training techniques. In one embodiment, training is performed only once and those values are used continuously thereafter. Alternately, a training module can be set up to conduct training operations every time the system is started up or reset. In more complex embodiments, training can be conducted periodically. Variations in temperature as well as other environmental conditions can change the frequency response of the system, thus making periodic training desirable. Continuous adaptive training while the radar system is operating also is possible.

Training for the gain and phase terms can be simplified by, for example, individually activating selected transmitters in the array and observing the impulse response at individual receivers in the array. Furthermore, in one preferred embodiment of the invention, training is performed at a plurality of fixed frequency tones across the chirped signal band to obtain initial phase and gain calibration values for each path. Then, gain and phase values for frequencies between those points are calculated by interpolation.

Training can be performed by any reasonable circuitry, including, but not limited to, digital logic circuitry, a programmed computer, a programmed microprocessor, an application specific integrated circuit (ASIC), a state machine, a digital signal processor (e.g., receive digital signal processor 261), or any combination of the foregoing.

While the invention has been described in connection with canceling the chirp signals from other transmitters in a radar system having an antenna array comprising multiple antennas, this is merely exemplary. The methods and apparatus of the invention can be used to cancel essentially any form of interference or unwanted signal that is narrow band instantaneously, but undulating over a wider frequency over time in a known manner. Merely as an example, the concepts of the present invention can be employed to cancel local echo signals in a transmit channel transmitting a chirped signal (or any other known signal that is instantaneously narrow in bandwidth but varying over a broader bandwidth over time).

In fact, the concepts of the present invention can be used to cancel echo in the transmit paths in the system illustrated in FIGS. 1 and 2. FIG. 2 shows an analog echo cancellation sub-system 250 in accordance with the principles of the present invention interposed in the receive signal path of the system. Particularly, the signal received by antenna 214 passes through the circulator 229 and into an analog echo cancellation sub-system 250 before being forwarded to a mixer 255 for mixing with the local oscillator signal for frequency down converting the received RF signal to an intermediate frequency (IF) signal. The IF signal is then passed through a band pass filter 257 before being input into aforementioned adder 230 for subtracting the transmit cancellation signal therefrom. The output of adder 230 is fed to an analog to digital converter 259 for conversion into a digital signal. The digital signal is input to receive the digital signal processing circuitry 261 for processing.

When the transmit signal output by amplifier 227 is transmitted out over the antenna 214, it may generate echoes of the transmit signals on the receive path between antenna 214 and mixer 255 (as well as on the transmit path itself, e.g., the path between antenna 214 and mixer 212). Such echoes would be caused by any impedance mismatches at any interfaces between circuit components. For instance, the interface between the circulator 229 and the antenna 214 could cause an echo to appear on the receive signal path (as well as the transmit signal path).

An analog echo cancellation sub-system 250 in accordance with the principles of the present invention can also be used to cancel such echo. Particularly, the transmit signal path is tapped, as shown at 267, and split, as shown at 269, before being fed into first and second phase and amplitude control circuits 243 and 249. Phase and amplitude control circuits 243, 249 essentially are single-term, variable, phase and amplitude adjustment circuits similar to the complex gain multipliers 216 contained in the transmit module 202. They are adapted to cancel the chirped transmit signal only in its narrow band instantaneous frequency range. The multipliers 243, 249 vary the narrowband cancellation signal in amplitude and phase as a function of the frequency of the chirped transmit signal.

Although given a different name (i.e., phase and amplitude modulators (PAMs) because the signals in echo cancellation subsystem 250 are real, analog signals, whereas the signals in subsystem 202 are complex digital signals), circuits 243 and 249 are essentially the same circuits as complex multipliers 216.

In the particular embodiment shown in FIG. 2, there are two such phase and amplitude modulator (PAM) circuits 243, 249 in order to best cancel the echo. Specifically, the cancellation signal generated by PAM 243 is added to the receive signal path by adder 241 before low noise amplifier 245 to cancel most of the echo. As is typical, however, the received signal is passed through a low noise amplifier 245 to increase its amplitude before being processed further. This amplification, of course, also will amplify any echo remaining in the receive path. Therefore, in a preferred embodiment of the invention, a second PAM 249 is included and its cancellation signal is added by another adder 247 interposed in the receive path after the low noise amplifier 245 in order to further cancel any remaining echo in the signal path.

As with multipliers 216 discussed above, the cancellation signals of PAM blocks 243, 249 must be varied in both amplitude and phase as a function of frequency. Thus, also as above, the PAMs should be trained to determine the necessary algorithm to vary the amplitude and/or phase of the cancellation signal as a function of frequency of the transmit signal. The necessary algorithm can be readily determined during a training session using conventional training techniques. Thus, for training purposes, analog to digital converters 251 and 253 are coupled to the receive path after the low noise amplifier 245 and after the second adder 247, respectively, so as to be able to tap off the signals on the receive path during training sessions and provide them to the processor 261 for generating the necessary algorithm. Analog to digital converters 251, 253 are not used during normal transmit or receive operations, but only during training sessions.

The invention is not limited to wireless environments. In fact, it should be apparent that the local echo cancellation discussed in the immediately preceding paragraphs is a wired, hardware issue (that just happens to be incorporated in a wireless system).

Note also that the invention is not necessarily limited to use in connection with chirped signals, but can be applied to correct any signal that is narrow band instantaneously, but varies over a wider bandwidth over time.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method of canceling an interference signal from a receive signal, said interference signal having a narrow instantaneous bandwidth and a broad bandwidth over time, said method comprising the steps of:
  (1) determining a frequency-dependent gain factor, said gain factor comprising an amplitude and phase frequency response adapted to compensate for said interference signal in its narrow instantaneous bandwidth, said gain factor being varied as a function of said frequency of said interference signal over said broad bandwidth;
  (2) generating a first signal that is equivalent to a source signal of said interference signal;
  (3) multiplying said first signal by said gain factor to generate a cancellation signal; and
  (4) adding said cancellation signal to said receive signal.

2. The method of claim 1 wherein said gain factor comprises a single complex term.

3. The method of claim 2 wherein said complex gain factor is of the form $$g_n(f)=A_n(f)*e^{j\phi_n(f)}$$

wherein
  f=instantaneous frequency of said interference signal;
  $A_n(f)$=amplitude of said interference signal as a function of f; and
  $\phi_n(f)$=phase of said interference signal as a function of f.

4. The method of claim 3 wherein said source signal of said interference signal is a chirped signal.

5. The method of claim 4 wherein steps (1), (2), (3), and (4) are performed for a multiplicity of interference signals having different amplitude and phase responses over said broad frequency range.

6. The method of claim 5 wherein each of said multiplicity of interference signals comprises a plurality of interference signals sourced from a plurality of sources, each of said plurality of sources having the same amplitude and phase response over said broad frequency range.

7. The method of claim 2 wherein said interference signal comprises a plurality of interference signals from a plurality of sources, each of said plurality of interference signals having the same amplitude and phase response over said broad frequency range.

8. The method of claim 1 wherein said method is used to cancel interference at a first antenna in a communication system comprising an antenna array and said interference signal is a transmit signal from at least a second antenna in said antenna array and wherein step (2) comprises using a transmit signal of said first antenna as said first signal.

9. The method of claim 1 wherein step (1) comprises training said gain factor for said interference signal.

10. A receiver apparatus for receiving a receive signal containing a interference signal, said interference signal having an narrow instantaneous bandwidth but a broad bandwidth over time, said apparatus comprising:
  a training module adapted to determine a complex gain factor corresponding to an amplitude and phase frequency response of said interference signal in its narrow instantaneous bandwidth, said gain factor being a function of said frequency of said interference signal over said broad bandwidth;
  a receive path on which said receive signal is sent to receiver circuitry;
  a signal source, said signal source generating a first signal that is equivalent to a source signal of said interference signal;
  a complex gain multiplier coupled to receive said first signal and adapted to multiply said first signal by said complex gain factor to generate a cancellation signal; and
  an adder coupled to add said cancellation signal to said receive signal.

11. The apparatus of claim 10 wherein said complex gain factor comprises a single complex term.

12. The apparatus of claim 11 wherein said complex gain factor is of the form $$g(f)=A(f)*e^{j\phi(f)}$$

wherein
  f=instantaneous frequency of said interference signal;
  $A(f)$=amplitude of said interference signal as a function of f; and
  $\phi(f)$=phase as a function of f.

13. The apparatus of claim 12 wherein said source signal of said interference signal is a chirped signal.

14. The apparatus of claim 13 wherein said receiver apparatus is part of a radar system comprising a plurality of transmitting and receiving antennas, each having a corresponding transmitter circuit and receiver circuit, and wherein each of said transmitting antennas transmits a chirped transmit signal having the same narrow instantaneous frequency and further wherein said signal source is the transmitter circuit corresponding to said receiver apparatus.

15. The apparatus of claim 14 wherein said transmitting antenna and said receiving antenna in each said pair are the same antenna.

16. The apparatus of claim 15 wherein said interference signal comprises a multiplicity of interference signals, each generated from an identical signal source and each having a different complex amplitude and phase response as a function of frequency of said source signal and wherein said complex gain multiplier comprises a multiplicity of complex gain multipliers, one corresponding to each said interference signals.

17. The apparatus of claim 16 wherein each of said multiplicity of interference signals comprises a plurality of interference signals sourced from a plurality of sources, each of said plurality of sources having the same amplitude and phase response over said broad frequency band.

18. The apparatus of claim 11 wherein said interference signal comprises a plurality of interference signals sourced from a plurality of sources, each of said plurality of interference signals having the same amplitude and phase response over said broad frequency band.

19. The apparatus of claim 10 wherein said receiver apparatus is part of an antenna array comprising a local antenna and a plurality of other antennas and wherein said local antenna and said other antennas transmit signals having the same narrow instantaneous frequency and wherein said interference signal is a transmit signal from at least one of said other antennas and wherein said first signal is a transmit signal of said local antenna.

20. A radar apparatus comprising:
   a plurality of transmit/receive subsystems, each comprising;
      a transmit/receive antenna;
      a signal source for generating a transmit signal to be transmitted by said transmit antenna;
      a transmitter circuit coupled between said signal source and said transmit antenna;
      a receiver circuit coupled to receive a receive signal from said receive antenna, said receive signal containing an interference signal, said interference signal having an narrow instantaneous bandwidth but a broad bandwidth over time;
      a complex gain multiplier coupled to receive said transmit signal and adapted to multiply said transmit signal by said complex gain factor to generate a cancellation signal; and
      an adder coupled to add said cancellation signal to said receive signal; and
   a training module adapted to determine said complex gain factor for each said transmit/receive subsystem, each said complex gain factor comprising an amplitude and phase frequency response of said interference signal as a function of bandwidth over said broad bandwidth.

21. The radar apparatus of claim 20 wherein said transmit signal of each said transmit/receive subsystem is a chirped signal having an narrow instantaneous bandwidth but a broad bandwidth over time, each of said chirped signals having the same amplitude and narrow instantaneous bandwidth.

22. The radar apparatus of claim 21 wherein each said transmit/receive antenna comprises a single antenna.

23. The radar apparatus of claim 21 wherein each said complex gain factor comprises a single complex term.

24. The method of claim 23 wherein said complex gain factor is of the form $$g(f)=A(f)*e^{j\phi(f)}$$

wherein
   f=instantaneous frequency of said interference signal;
   A(f)=amplitude of said interference signal as a function of f; and
   $\phi$(f)=phase as a function of f.

25. The radar apparatus of claim 24 wherein each said complex gain multiplier is adapted to compensate for a plurality of interference signals sourced from a plurality of said transmit antennas of said radar apparatus other than said corresponding transmit antenna, wherein each of said plurality of interference signals has the same amplitude and phase response over said broad frequency band.

* * * * *